(12) United States Patent
Tang

(10) Patent No.: US 9,104,069 B2
(45) Date of Patent: Aug. 11, 2015

(54) BACKLIGHT MODULE AND LIQUID CRYSTAL DISPLAY DEVICE USING THE SAME

(71) Applicant: SHENZHEN CHINA STAR OPTOELECTRONICS TECHNOLOGY CO., LTD., Shenzhen, Guangdong (CN)

(72) Inventor: Guofu Tang, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 202 days.

(21) Appl. No.: 13/811,185

(22) PCT Filed: Sep. 19, 2012

(86) PCT No.: PCT/CN2012/081573
§ 371 (c)(1),
(2) Date: Jan. 18, 2013

(87) PCT Pub. No.: WO2014/005376
PCT Pub. Date: Jan. 9, 2014

(65) Prior Publication Data
US 2014/0009716 A1    Jan. 9, 2014

(30) Foreign Application Priority Data
Jul. 3, 2012    (CN) .......................... 2012 1 0226598

(51) Int. Cl.
*G02F 1/1335*    (2006.01)

(52) U.S. Cl.
CPC ................................. *G02F 1/133608* (2013.01)

(58) Field of Classification Search
CPC ..................... G02F 1/133314; G02F 1/133608
USPC ........................................................ 349/58
See application file for complete search history.

(56) References Cited

U.S. PATENT DOCUMENTS 8,662,693 B2 * 3/2014 Huang ......................... 362/97.4
2009/0225252 A1 * 9/2009 Jeong .............................. 349/58
2009/0268121 A1 * 10/2009 Hisada ............................ 349/58

FOREIGN PATENT DOCUMENTS

| CN | 101158772 A | 4/2008 |
| CN | 101206338 A | 6/2008 |
| CN | 101305316 A | 11/2008 |
| CN | 102175001 A | 9/2011 |
| JP | 2009151112 A | 7/2009 |
| JP | 2009-211933 A | 9/2009 |

* cited by examiner

*Primary Examiner* — Thanh-Nhan P Nguyen
(74) *Attorney, Agent, or Firm* — Muncy, Geissler, Olds & Lowe, P.C.

(57) ABSTRACT

A backlight module includes a back plate having at least one side and a backlight unit including an optical plate and an optical film. The at least one side has a surface, and the surface is disposed with a supporting member. The supporting member includes a horizontal portion and a vertical portion extended from the horizontal portion. In addition, the vertical portion includes a plane surface and a protruding piece, and the plane surface is used for supporting the optical plate and the protruding piece is used for positioning the optical film; and a liquid crystal display device has the backlight module.

11 Claims, 8 Drawing Sheets

BACKLIGHT MODULE AND LIQUID CRYSTAL DISPLAY DEVICE USING THE SAME

FIELD OF THE INVENTION

The present invention relates to a backlight module, and more particularly to a backlight module including a supporting member having a plane surface for supporting an optical plate and a protruding piece for positioning an optical film, and a liquid crystal display device using the same.

BACKGROUND OF THE INVENTION

Referring to FIGS. 1 to 3, FIG. 1 illustrates a conventional liquid crystal display device; FIG. 2 illustrates an optical plate broken or deformed due to a force applied at a steel pillar of a backlight module of the liquid crystal display device of FIG. 1; FIG. 3 illustrates a point contact of an optical film touching with a steel pillar of a backlight module of the liquid crystal display device of FIG. 1.

As shown in FIG. 1, a liquid crystal display device 1 comprises a backlight module 10 and a liquid crystal panel 11. A back plate 100 of the backlight module 10 is normally bent into an n-shape to form for increasing the strength of the back plate. In an extra large size module, the back plate 100 is generally assembled by an aluminum sheet and a metal sheet. When positioning an optical film 101 or an optical plate 102 (e.g., a diffusion plate), because the formation of the aluminum sheet can't be formed by flange-stamping as that of the metal sheet does, the optical film 101 or the optical plate 102 is normally positioned by a steel pillar 103.

As shown in FIG. 2, because a contact between the steel pillar 103 and the other component such as optical sheets is a point contact, a contact area where the steel pillar 103 is in touch with the optical plate 102 is very small. When a vibration happens, the optical plate 102 may subject to a large pressure due to the counteraction force of the steel pillar 103; that is, the stress is concentrated, and the optical plate 102 may be deformed and then broken as shown in the wave lines of FIG. 2. As shown in FIG. 3, the sheet-shaped optical film 101 is hung on the steel pillar 103, which is also a point contact; therefore, when a force is applied to a point of the sheet-shaped optical film 101, the force is split into two components (as shown in the arrow of FIG. 3) under gravity and using the forced point as a center point. That is, sheet-shaped optical film 101 is unable to balance with only one supporting point, such that the optical film 101 may be warped and deformed which leads to a non-uniform illumination in the backlight module.

Moreover, in order to get larger strength, the steel pillar 103 adopted in the backlight module cannot too small, while a space in the backlight module is required for disposing the bottom portion of the steel pillar 103 and riveting and stamping, such that a narrow bezel backlight module can't be realized easily.

SUMMARY

The present invention provides a backlight module comprising a back plate and a backlight unit. The back plate has at least one side, and the backlight unit comprises an optical plate and an optical film, wherein the at least one side has a surface, and the surface is disposed with a supporting member. The supporting member includes a horizontal portion and a vertical portion extended from the horizontal portion. The vertical portion includes a plane surface and a protruding piece, and the plane surface is used for supporting the optical plate, and the protruding piece is used for positioning the optical film.

The backlight module according to an embodiment of the present invention further comprises:
the horizontal portion is fixed on the surface, and the horizontal portion is fixed on the surface by a screw member;
the horizontal portion is fixed on the surface by soldering; and
the at least one side is an aluminum sheet.

The present invention provides a liquid crystal display device comprises a backlight module comprising a back plate having at least one side and a backlight unit, and a liquid crystal display panel disposed above the backlight module, wherein the backlight unit includes an optical plate and an optical film, and the at least one side has a surface. The surface is disposed with a supporting member, and the supporting member includes a horizontal portion and a vertical portion extended from the horizontal portion. In addition, the vertical portion includes a plane surface and a protruding piece, and the plane surface is used for supporting the optical plate, and the protruding piece is used for positioning the optical film.

The liquid crystal display device according to an embodiment of the present invention further comprises:
the horizontal portion is fixed on the surface, and the horizontal portion is fixed on the surface by a screw member;
the horizontal portion is fixed on the surface by soldering; and
the at least one side is an aluminum sheet.

In conclusion, the embodiment of the present invention has the following advantageous effect: the plane surface of the supporting member is used to support the optical plate, and the protruding piece is used to position the optical film, such that the position strength of the optical plate and the optical film are increased.

DETAILED DESCRIPTION

Now, the preferred embodiment of the present invention will be described in detail with reference to the accompanying drawings.

Figure 1:
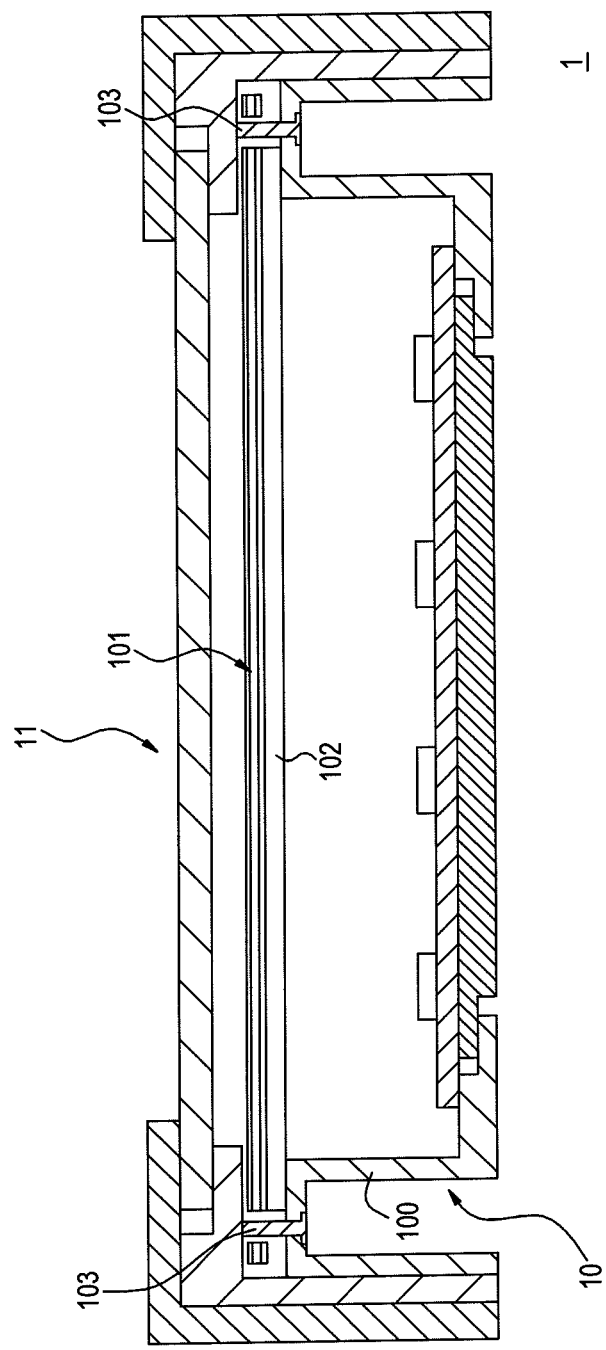
FIG. 1 is a perspective view illustrating a conventional liquid crystal display device.
Figure 2:
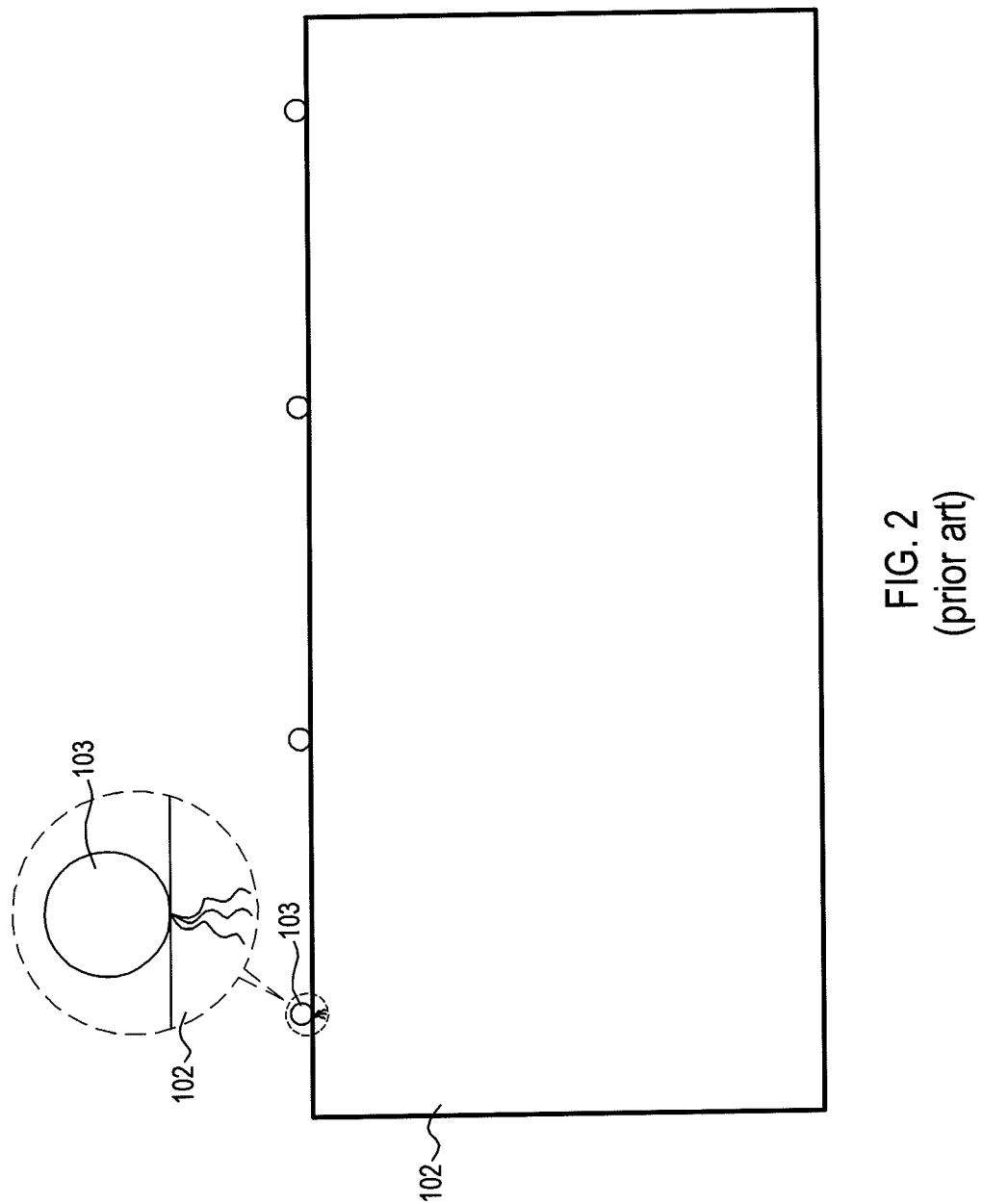
FIG. 2 is a perspective view illustrating an optical plate broken or deformed due to a force applied to a steel pillar of a backlight module of the liquid crystal display device of FIG. 1.
Figure 3:
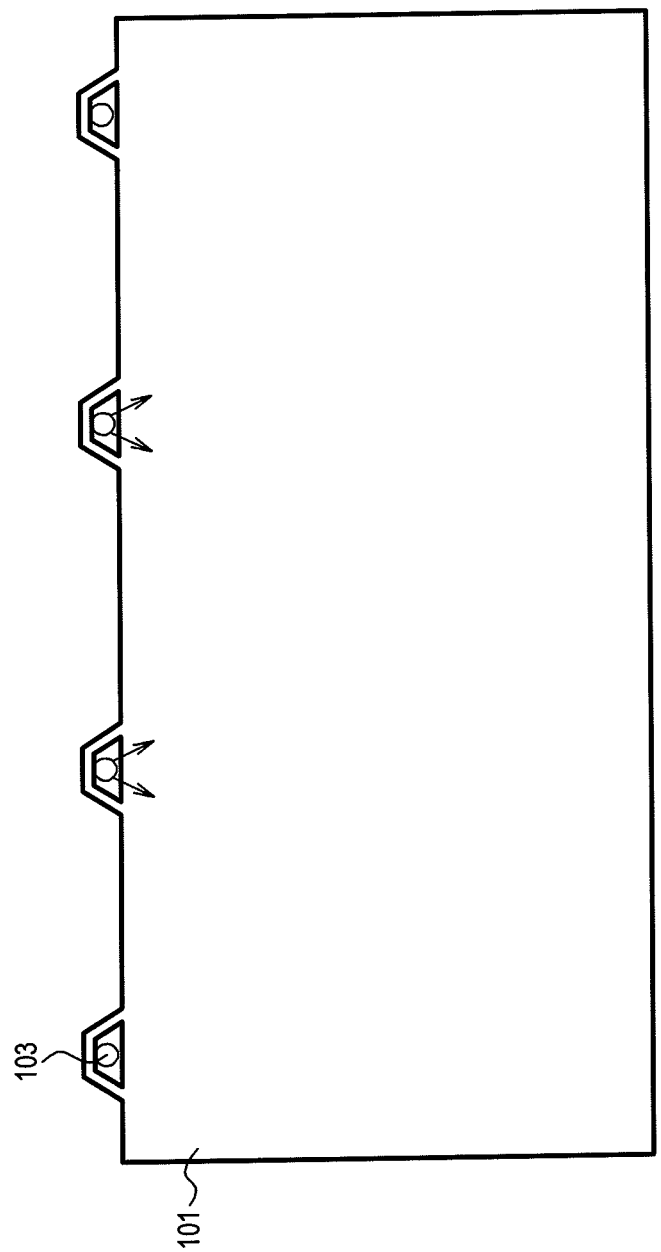
FIG. 3 is a perspective view illustrating a contact point of an optical film with a steel pillar of a backlight module of the liquid crystal display device of FIG. 1.
Figure 4:
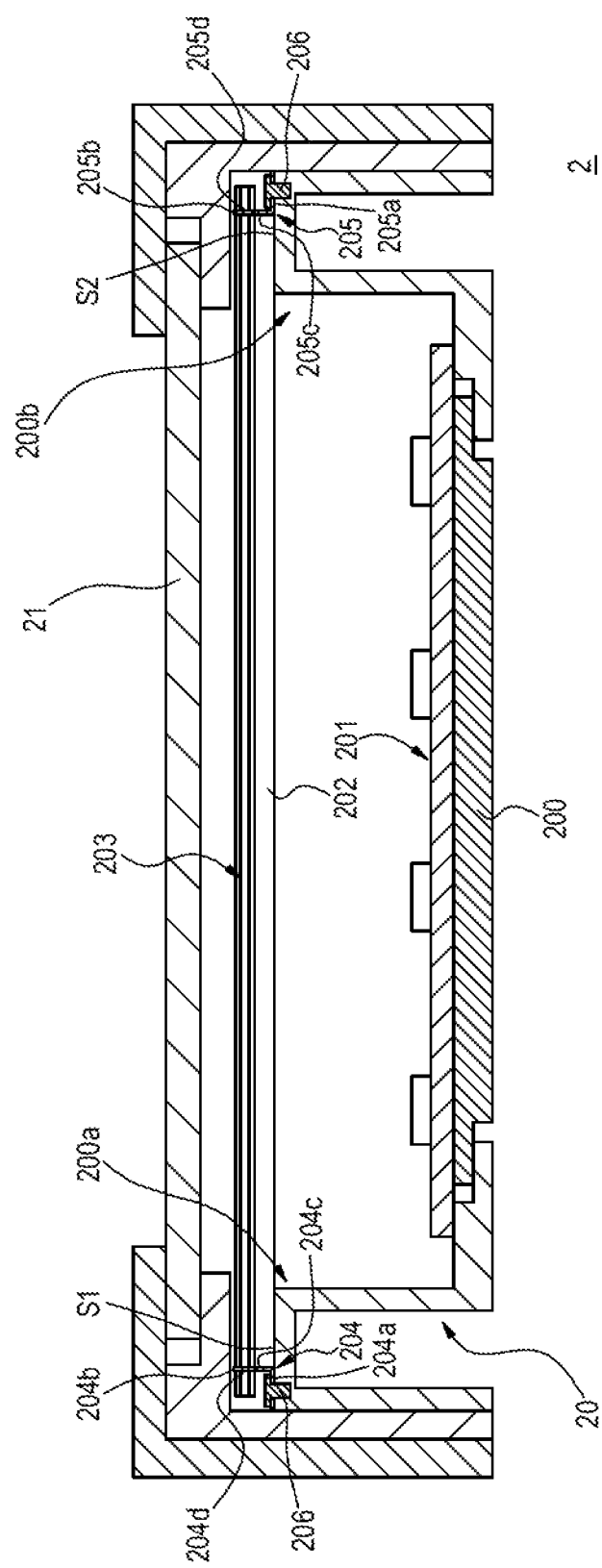
FIG. 4 is a perspective view illustrating a backlight module of a liquid crystal display device having a supporting member according to an embodiment of the present invention.
Figure 5:
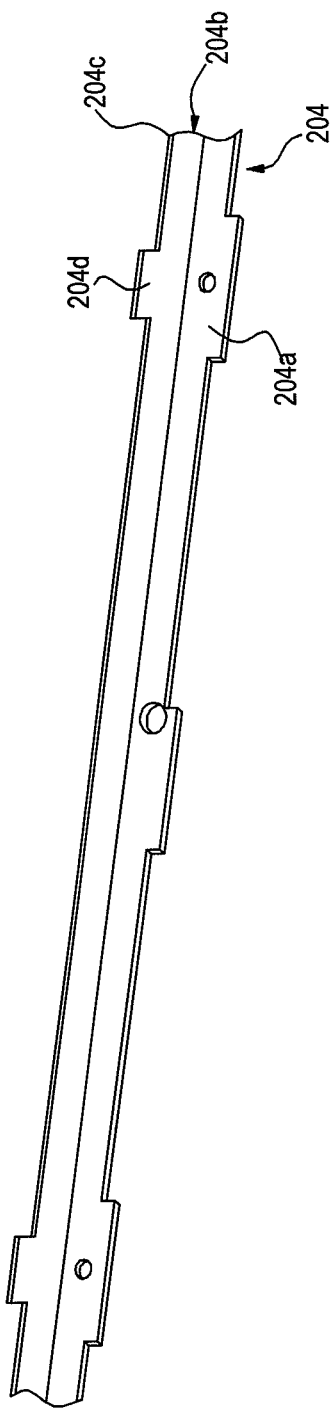
FIG. 5 is a perspective view illustrating the supporting member of the backlight module of FIG. 4.

Referring to FIGS. 4 and 5, FIG. 4 is a perspective view illustrating a backlight module of a liquid crystal display device having a supporting member according to an embodiment of the present invention; FIG. 5 is a perspective view illustrating the supporting member of the backlight module of FIG. 4.

As shown in FIG. 4, a liquid crystal display device 2 comprises a backlight module 20 and a liquid crystal display panel 21 disposed above the backlight module 20. The backlight module 20 comprises a back plate 200. The back plate 200 has at least one side. In an embodiment, a first side 200a and a second side 200b of the back plate 200 are exemplarily used as the at least one side, but not limited herein.

The backlight module 20 has a backlight unit 201. The backlight unit 201 includes an optical plate 202 and an optical film 203. It is to be noted that the backlight module 20 of the embodiment is a direct-illumination type backlight module in this embodiment, and a diffusion plate is exemplarily used as the optical plate 202. On the other hand, if the backlight module 20 is an edge-illumination type backlight module, the optical plate 202 is a light guide plate. That is, a supporting member (a first supporting member 204 or a second supporting member 205) according to one embodiment of the present invention can be applied at the direct-illumination type backlight module or the edge-illumination type backlight module, and the supporting member is used for positioning the optical plate 202 or optical film 203.

The first side 200a has a first surface S1. The second side 200b has a second surface S2. The first surface S1 is disposed with a first supporting member 204, or the second surface S2 is disposed with a second supporting member 205.

More specifically, the first supporting member 204 (or the second supporting member 205) is shown in FIG. 5, and the structure of the first supporting member 204 is the same as that of the second supporting member 205; therefore, only the first supporting member 204 is shown herein for explanations As shown in FIG. 5, the first supporting member 204 includes a first horizontal portion 204a and a first vertical portion 204b extended from the horizontal portion 204a, wherein the first vertical portion 204b includes a first plane surface 204c and a first protruding piece 204d.

The second supporting member 205 includes a second horizontal portion 205a and a second vertical portion 205b extended from the horizontal portion 205a, wherein the second vertical portion 205b includes a second plane surface 205c and a second protruding piece (which refers to the first protruding piece 204d of FIG. 5).

Figure 6:
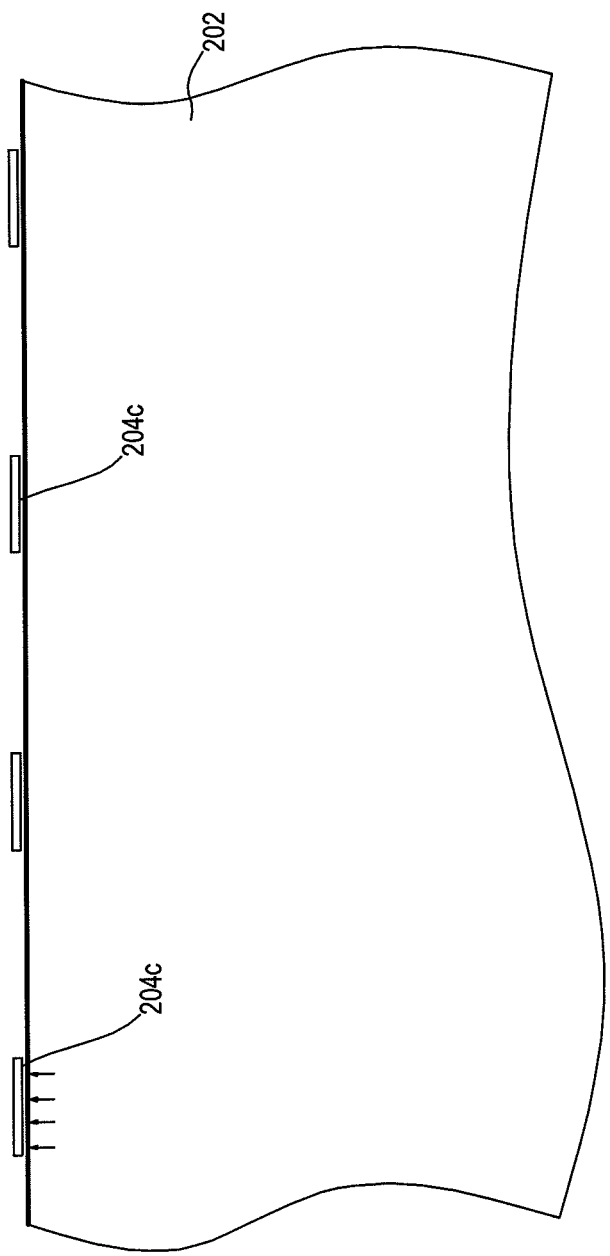
FIG. 6 is a perspective view illustrating an optical plate supported by the supporting member of FIG. 4.
Figure 7:
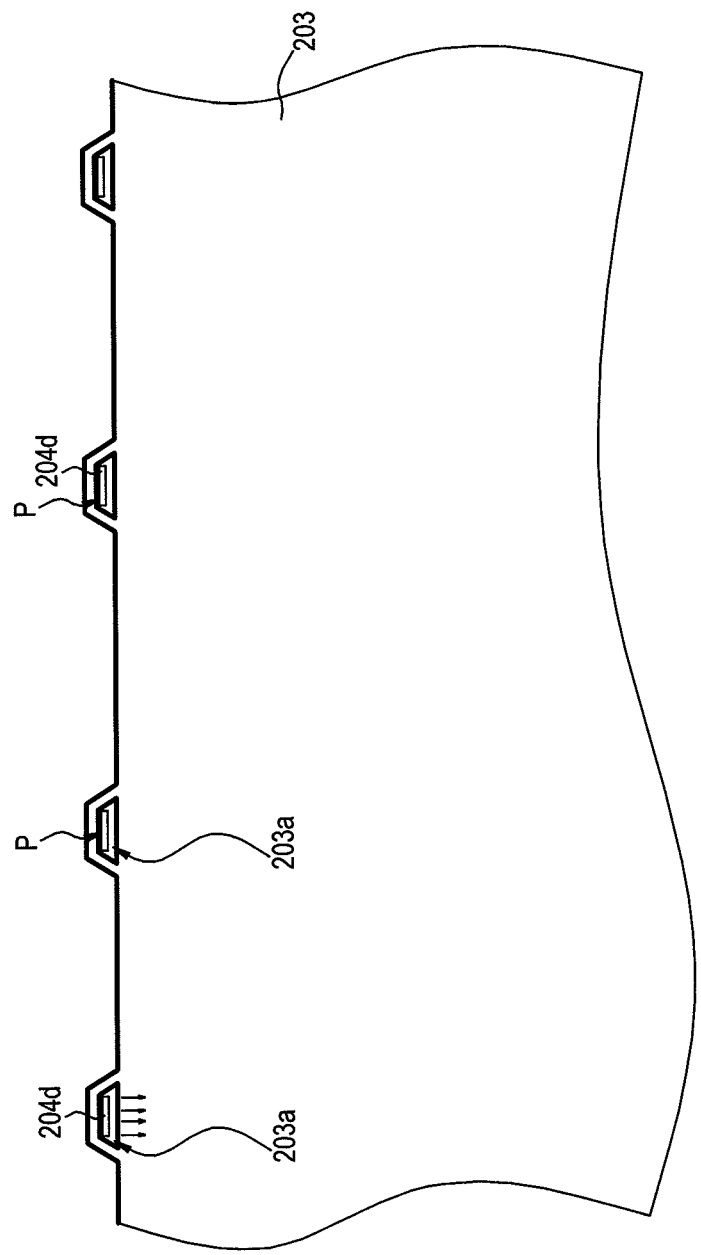
FIG. 7 is a perspective view illustrating an optical film positioned by the supporting member of FIG. 4.

Referring to FIGS. 4 to 7, FIG. 6 is a perspective view illustrating an optical plate supported by the supporting member of FIG. 4. FIG. 7 is a perspective view illustrating an optical film positioned by the supporting member of FIG. 4.

The first plane surface 204c of the first supporting member 204 or the second plane 205c of the second supporting member 205 can support the optical plate 202 as shown in FIG. 4 and FIG. 6, wherein, in FIG. 6, it only shows the first plane surface 204c to support the optical plate 202. The first protruding piece 204d of the first supporting member 204 or the second protruding piece of the supporting member 205 can position the optical film 203 as shown in FIG. 4, FIG. 5, and FIG. 7, wherein, in FIG. 7, it only shows the first protruding piece 204d to position the optical film 203.

As FIG. 4, the supporting member (the first supporting member 204 and the second supporting member 205) may be formed by metal sheet stamping or plastic molding. The first horizontal portion 204a is fixed on the first surface S1. The horizontal portion 205a is fixed on the second surface S2. For example, the first surface S1 and the second surface S2 of the back plate 200 can form with a screw hole, wherein the horizontal portion 204a of the first supporting member 204 and the second horizontal portion 205a of the second supporting member 205 are fixed on the first surface S1 and the second surface S2 of the back plate 200 (which is an aluminum sheet) by a screw member 206, respectively. If the supporting member is formed by metal sheet stamping, the first horizontal portion 204a and the second portion 205a can be fixed on the first surface S1 and the second surface S2 by soldering, respectively. However, the types of fixing the supporting member on the first surface S1 and the second surface S2 are exemplary examples, but not limited herein.

As shown in FIG. 4, the horizontal portion 204a and the second portion 205a are disposed on the first surface S1 and the second surface S2 of the first side 200a and the second side 200b of the back plate 200 (e.g., an aluminum sheet), respectively. The first surface S1 and the second surface S2 support the optical plate 202, and the optical film 203 is disposed on the optical plate 202.

The first vertical portion 204b of the first supporting member 204 and the vertical portion 205b of the second supporting member 205 are used for supporting the optical plate 202; therefore, if there is a vibration on the optical sheet 202, the vibration impacts of the optical sheet 202 can be uniformly distributed to the first plane surface 204c of the first vertical portion 204b and the second plane surface 205c of the second vertical portion 205b, such that the force can be balanced on the optical sheet 202. Preferably, the first vertical portion 204b and the second vertical portion 205b may form with a plurality of bumps to prevent from insecurely contacting with the optical plate 202 due to uneven surfaces of the first vertical portion 204b and the second vertical portion 205b or an uneven attachment with the optical plate 202.

As shown in FIG. 7, the optical film 203 includes a plurality of through holes 203a and is hung on the first protruding piece 204d and the second protruding piece (which refers to the first protruding piece 204d of FIG. 5) by the through holes. The first protruding piece 204d and the second protruding piece have a plane surface P, such that the hanging force can be uniformly distributed on the optical film 203. The forced direction and the gravity direction of the optical film are in a vertical direction, such that the force will not be split into components and the warpage of the optical film 203 will not be appeared.

Figure 8:
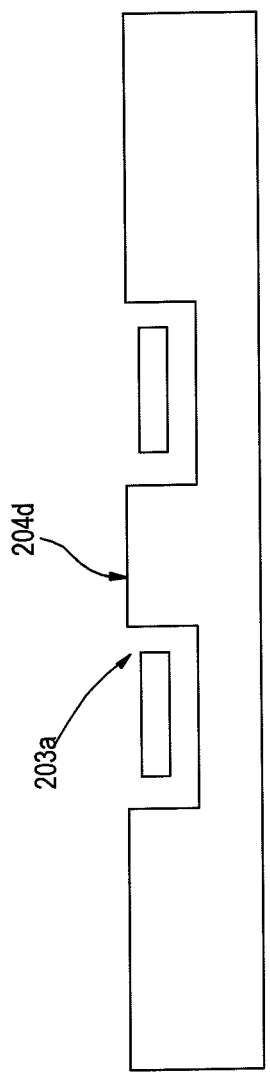
FIG. 8 is a perspective view illustrating a backlight module having a supporting member of FIG. 4 according another embodiment of the present invention.

Referring to FIG. 8, it illustrates a backlight module having a supporting member of FIG. 4 according another embodiment of the present invention.

As shown in FIG. 8, the first protruding piece 204d of the first support member 204 (or the second protruding piece of the second supporting member 205) may be a shape that is high at center and low at two sides. The supporting member is formed by metal sheet stamping or plastic molding, wherein the thickness of the supporting member is thinner than the rivet (pillar), such that the width of the bezel of the backlight module can be reduced.

As the foregoing, the backlight module and the liquid crystal display device using the same of the present invention has the following advantageous effects:

1. the first plane surface of the first supporting member or the second plane surface of the second supporting member is used for supporting the optical plate, and the first protruding piece or the second protruding piece is used for positioning the optical film, such that the position strength of the optical plate and the optical film are increased.
2. the supporting member (the first supporting member or the second supporting member) is formed by metal sheet stamping or plastic molding, wherein the thickness of the supporting member is thinner than the rivet, such that the width of the bezel of the backlight module can be reduced.

The previous description of the preferred embodiment is provided to further describe the present invention, not intended to limit the present invention. Any modification apparent to those skilled in the art according to the disclosure within the scope will be construed as being included in the present invention.

What is claimed is:

1. A backlight module, comprising:

a back plate, having at least one side; and a backlight unit, comprising an optical plate and an optical film;

wherein the at least one side has a surface, the surface is disposed with a supporting member, the supporting member includes a horizontal portion and a vertical portion extended from the horizontal portion, the vertical portion includes a plane surface and a protruding piece, the plane surface supports the optical plate, the protruding piece positions the optical film, the horizontal portion is fixed on the surface by a screw member or soldering, and the at least one side of the back plate is an aluminum sheet.

2. A backlight module, comprising:

a back plate, having at least one side; and a backlight unit, comprising an optical plate and an optical film;

wherein the at least one side has a surface, the surface is disposed with a supporting member, the supporting member includes a horizontal portion and a vertical portion extended from the horizontal portion, the vertical portion includes a plane surface and a protruding piece, the plane surface supports the optical plate, and the protruding piece positions the optical film.

3. The backlight module of claim 2, wherein the horizontal portion is fixed on the surface.

4. The backlight module of claim 3, wherein the horizontal portion is fixed on the surface by a screw member.

5. The backlight module of claim 2, wherein the horizontal portion is fixed on the surface by soldering.

6. The backlight module of claim 2, wherein the at least one side is an aluminum sheet.

7. A liquid crystal display device comprising:

a backlight module comprising a back plate having at least one side and a backlight unit; and a liquid crystal display panel disposed above the backlight module;

wherein the backlight unit includes an optical plate and an optical film, the at least one side has a surface, the surface is disposed with a supporting member, the supporting member includes a horizontal portion and a vertical portion extended from the horizontal portion, the vertical portion includes a plane surface and a protruding piece, the plane surface supports the optical plate, and the protruding piece positions the optical film.

8. The liquid crystal display device of claim 7, wherein the horizontal portion is fixed on the surface.

9. The liquid crystal display device of claim 8, wherein the horizontal portion is fixed on the surface by a screw member.

10. The liquid crystal display device of claim 7, wherein the horizontal portion is fixed on the surface by soldering.

11. The liquid crystal display device of claim 7, wherein the at least one side is an aluminum sheet.

* * * * *